S. J. ANDERSON.
COMPOSITE BLOCK.
APPLICATION FILED SEPT. 30, 1914.
1,132,996.
Patented Mar. 23, 1915.
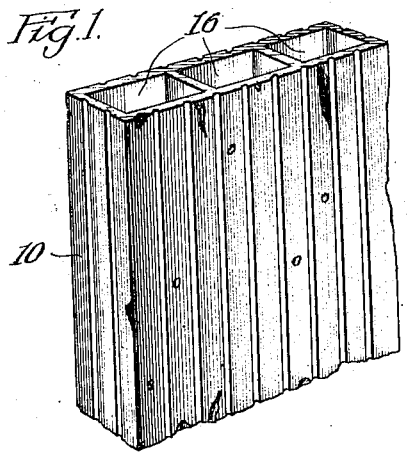
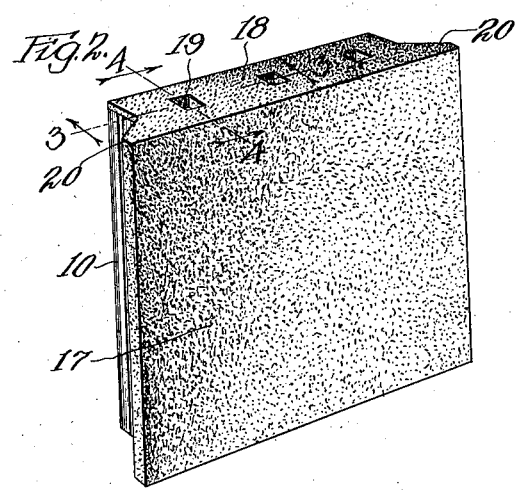
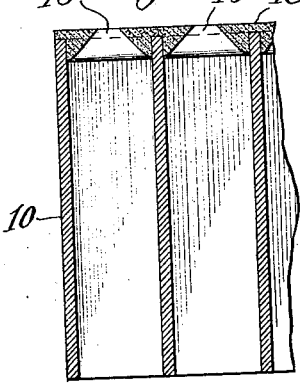
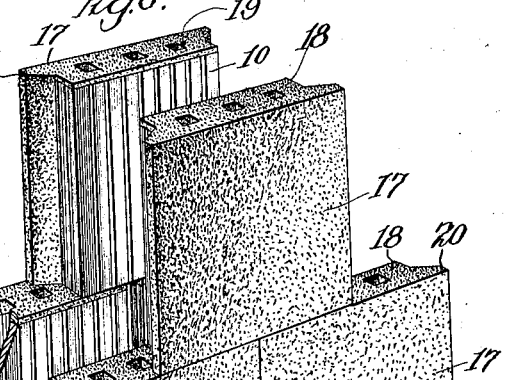
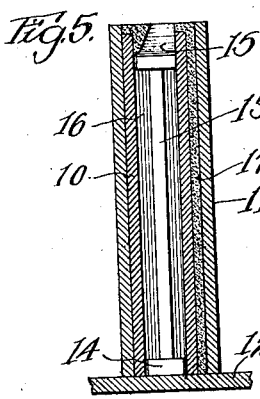
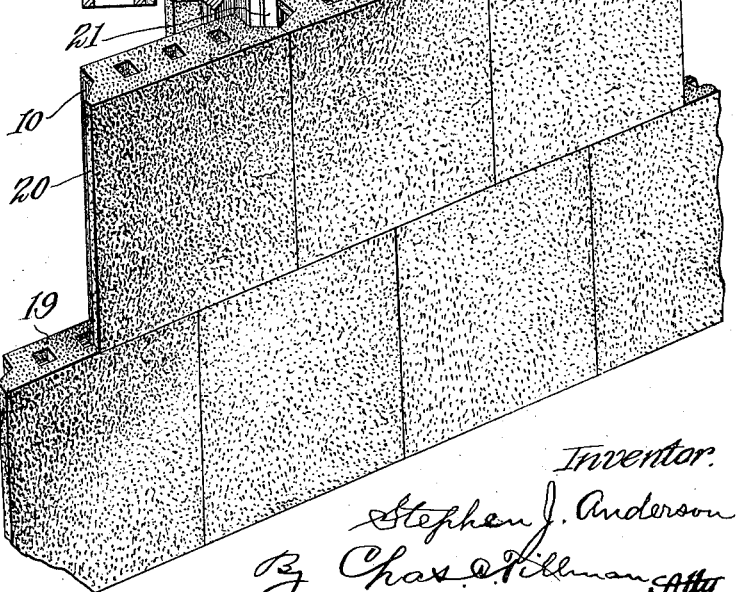
Witnesses:
Leo J. DuMais.
Arthur B. Framke.
Inventor.
Stephen J. Anderson
By Chas. E. Tillman Atty

UNITED STATES PATENT OFFICE.

STEPHEN J. ANDERSON, OF HARVEY, ILLINOIS.

COMPOSITE BLOCK.

1,132,996.                     Specification of Letters Patent.     Patented Mar. 23, 1915.

Application filed September 30, 1914. Serial No. 864,277.

*To all whom it may concern:*

Be it known that I, STEPHEN J. ANDERSON, a citizen of the United States, residing at Harvey, in the county of Cook and State of Illinois, have invented certain new and useful Improvements in Composite Blocks, of which the following is a specification.

This invention relates to building construction, and has especial relation to composite blocks to be used in the erection of walls, and particularly the walls of buildings, and it consists in certain peculiarities of the construction, novel arrangement and operation of the parts thereof, as well as in the method of producing the blocks, as will be hereinafter more fully set forth and specifically claimed.

As is well known, the ordinary commercial tiling or terra-cotta blocks used extensively for inner walls and for "deadening" in the ceilings and floors of buildings, and sometimes for outer walls, are more or less defective in shape on account of the manner of manufacture and drying of the same, as well as, on account of the rough handling to which they are subjected, which often causes them to become chipped and notched at their edges and scarred on their surfaces. In other words, when delivered for use their walls are found to be warped, and sometimes cracked and to contain blow-holes, their edges untrue or out of plumb and notched by pieces being broken out of them, and their surfaces so mutilated as to render them rough and unsightly. In fact, they are in such shapes and conditions that they cannot be used as produced and delivered for any purpose, except where the roughest kind of material may be employed or where it is hidden, and even then in constructing a wall of them, a great deal of time, labor and skill, as well as material, such as mortar, is required to produce a firm and stable wall with true or plumb lines.

It is the principal object of my invention to utilize the ordinary commercial tile blocks, with all their roughness, unevenness, gaps and defects in producing composite building blocks, with finished faces, true line ends or edges, to the end, that a wall with a finished surface or surfaces, may be built up out of the blocks, in such a way, that they will fit so closely together and in such a true and uniform manner that little or no mortar will be required therebetween, and the seams will hardly be discernible, thus affording a face or faces to the wall, that will not require plastering, (unless desired), for inner walls. The spaces or seams between the blocks may be filled with putty or other suitable plastic material after the wall has been completed, and then the surface can be painted, calcimined or papered, in either of which cases a smooth finished surface will be presented which may be otherwise ornamented if desired.

In referring to the accompanying drawing, which illustrates an embodiment of the invention Figure 1 is a perspective view of a characteristic type of a tile block, such as is used commercially; Fig. 2 is a perspective view of a composite block embodying my invention; Fig. 3 is a vertical sectional view taken on line 3—3 of Fig. 2, looking in the direction indicated by the arrows; Fig. 4 is a similar view taken on line 4—4 of Fig. 2 as indicated by the arrows; Fig. 5 is a similar sectional view, showing the method of making the composite block and illustrating it in a mold provided with a core for the purpose of giving the desired construction to the block; and Fig. 6 is a perspective view of a portion of a wall for a building or other structure in the act of being built up out of my improved blocks.

Like numerals of reference refer to corresponding parts throughout the different views of the drawing.

The reference numeral 10 designates as a whole an ordinary tile block, such as are usually made of terra-cotta, and in Fig. 1 the said block is depicted as being defective and possessing blow-holes, cracks or gaps, and warped or uneven surfaces as is common in commercial tiling blocks. While the defects and imperfections of the tiling blocks render them useless for finished work, yet such defects are advantageous when they are employed in the construction of composite blocks involving my invention, as will be readily understood from the following explanation: By reason of the uneven lines of the ends and sides of the block 10, it is obvious that they cannot be placed so as to form a plumb wall without the use of a considerable amount of mortar or plastic material between them, and without the expenditure of a great deal of care and skill by the operator in placing them in position. In order to produce blocks of true geometrical lines, in which the commercial tiling blocks are employed, I take for example one of said blocks and place it in a mold 11, which is somewhat thicker than the tile block, as shown in Fig. 5, so that said block may rest against or approximate one of the side walls of the mold 11, yet have its other side located at a slight distance from the opposite side of the mold. When so placed the lower end of the block 10 will rest on the base 12 of the mold, while the upper end of the block 10 will be disposed a slight distance below the upper end of the mold. A core consisting of a stem 13, having on its lower end a base 14, which rests on the bottom 12 of the mold, and at its upper end a head 15 upwardly tapered from three of its surfaces, is then placed in each of the vertical openings 16 of the tile block. I then take a quantity of facing material, which is by preference composed of about four parts of sand and one part of cement, which have been thoroughly mixed together, and slightly moistened, and place the same in the space between the tile block 10 and the mold 11, and tamp the material until it is packed closely in said space around one face of the tile block, and at each of the sides thereof, as will be understood by reference to Fig. 2 of the drawing. The facing material is also placed on top of the tile block and around the head 15 of the cores and there tamped, after which the material is cut off or removed with a straight edged instrument or tool passed horizontally over the upper end of the mold 11, which operation will give to the composite block the form shown in Figs. 2 to 4 inclusive. Shortly after the tamping operation is completed, the mold is removed from the block and the cores are removed from the openings 16 therein through that end of the block which has rested on the base of the mold.

By the foregoing operation it will be seen and understood that the tile block 10 will be provided on one of its surfaces with a facing 17 and at its top with a facing 18, in which are located downwardly tapered openings 19, which communicate with the cavities 16 of the tile block. The facing material 18 on the upper end of the block extends into the tile block 10 and adheres closely thereto, and when set practically forms an integral part of the tile block, and the same can be said of the facing 17 on one of the surfaces of said block. As the walls of the openings 19 are inclined downwardly and toward the walls of the cavities of the tile block, it is evident that they will greatly reinforce said block at its upper portion, and that the openings 19 will permit of the passage of air through the different blocks, thus preventing moisture passing through the same.

By providing the front or outer surface 17 of each block with a lateral extension 20 at each of its sides, which extensions are coextensive with the facing 17, it is obvious that when the blocks are placed in the positions shown in Fig. 6, spaces 21 will be provided between the meeting edges of the blocks, which, when filled with concrete or other suitable plastic material, will form pilasters to give additional strength to the structure, and also to provide means at the upper end of the wall on which the beams of the ceiling may be mounted.

In constructing a wall out of the blocks, the latter are so placed as to break joints, as shown in Fig. 6, in which arrangement it will be understood that the openings 16 of the upper blocks will have communication through the openings 19 in the lower blocks with the openings or cavities 16 of the latter, so that a free circulation of air may be maintained throughout the series of hollow blocks. In Fig. 6 the wall is shown as being composed of two spaced apart walls of the completed composite blocks, and it will be understood that the space between the adjacent surfaces of said blocks may be filled with concrete as the building of the walls progress, and that portions of said concrete will enter the recesses 21 and form pilasters or upright supports, as above mentioned.

Having thus fully described my invention what I claim as new and desire to secure by Letters Patent is—

1. A composite block consisting of a hollow block and finishing material applied to one face and to one end thereof, a portion of said material applied to the end of the block being extended into the cavity thereof and provided with an opening having the inner faces of walls thereof downwardly and outwardly inclined.

2. A composite block consisting of a hollow block having its cavity divided into compartments and finishing material applied to one face and to one end of the block, a portion of said material applied to the end of the block being extended into each of said compartments and each of said extended portions provided with an opening having the inner faces of walls thereof downwardly and outwardly inclined, that portion of the material applied to the face of the block having at each of its side edges a lateral extension.

STEPHEN J. ANDERSON.

Witnesses:
 CHAS. C. TILLMAN,
 A. S. PHILLIPS.